United States Patent
Burke et al.

(10) Patent No.: US 7,046,978 B2
(45) Date of Patent: May 16, 2006

(54) METHOD AND APPARATUS FOR TRANSMIT PRE-CORRECTION IN WIRELESS COMMUNICATIONS

(75) Inventors: Joseph P. Burke, Carlsbad, CA (US); Michael J. Wengler, Carlsbad, CA (US); Bhaskar D. Rao, San Diego, CA (US); Harris S. Simon, Poway, CA (US)

(73) Assignee: Qualcomm, Inc., San Diego, CA (US)

( * ) Notice: Subject to any disclaimer, the term of this patent is extended or adjusted under 35 U.S.C. 154(b) by 359 days.

(21) Appl. No.: 10/071,452

(22) Filed: Feb. 8, 2002

(65) Prior Publication Data

US 2003/0153360 A1 Aug. 14, 2003

(51) Int. Cl.
*H04B 1/06* (2006.01)

(52) U.S. Cl. .................. 455/272; 455/276.1; 455/70; 370/337; 370/524; 375/148

(58) Field of Classification Search ............. 455/562.1, 455/69, 522, 67.16, 88, 272, 70, 276.1; 370/335, 370/342, 320, 441, 337, 524; 375/148
See application file for complete search history.

(56) References Cited

U.S. PATENT DOCUMENTS

| 5,613,219 | A | | 3/1997 | Vogel et al. | |
|---|---|---|---|---|---|
| 5,999,826 | A | * | 12/1999 | Whinnett | 455/561 |
| 6,070,086 | A | * | 5/2000 | Dobrica | 455/522 |
| 6,522,639 | B1 | * | 2/2003 | Kitade et al. | 370/335 |
| 6,647,003 | B1 | * | 11/2003 | Abeta et al. | 370/335 |
| 6,763,011 | B1 | * | 7/2004 | Hakkinen et al. | 370/337 |
| 2003/0125002 | A1 | * | 7/2003 | Harrison | 455/277.1 |

FOREIGN PATENT DOCUMENTS

| DE | 10032426 A1 | 1/2002 |
|---|---|---|
| EP | 1175022 A2 | 1/2002 |
| WO | 0191326 A1 | 11/2001 |
| WO | 0201732 A2 | 1/2002 |
| WO | 02001732 A3 | 1/2002 |
| WO | WO 02/01732 * | 1/2002 |

* cited by examiner

*Primary Examiner*—Danh Cong Le
(74) *Attorney, Agent, or Firm*—Philip Wadsworth; Sandra L. Godsey; Byron Yafuso (57) ABSTRACT

A wireless communication system includes a base station having a plurality of transmit antennas transmits pilot signals to a subscriber station. The subscriber station performs channel measurements on the signals received from the base station through at least two transmit paths and sends path characteristic information for each path to the base station. The base station uses the path characteristic information to determine how best to transmit data from the multiple transmit antennas to a single receive antenna at the subscriber station.

Through the use of pre-correction techniques, data signals are transmitted through the multiple transmit antennas such that signals received through the multiple transmit paths can be demodulated and decoded as a single signal.

5 Claims, 9 Drawing Sheets

METHOD AND APPARATUS FOR TRANSMIT PRE-CORRECTION IN WIRELESS COMMUNICATIONS

BACKGROUND

1. Field

The present invention relates generally to wireless communication, and more specifically to an improved method and apparatus for space-time pre-correction of transmitted wireless signals.

2. Background

Wireless communication carriers desire more wireless capacity. In other words, carriers desire to be able to service a greater number of subscribers within the same frequency band. To satisfy this need, code-division multiple-access (CDMA) systems have been proposed which are optimized for maximal wireless capacity. CDMA systems are often desirable over frequency-division multiple access (FDMA) or time-division multiple access (TDMA) systems for their robust performance in multipath environments. Multipath is a condition that occurs when a transmitter transmits a single signal that is received through multiple signal paths having different lengths. The difference in the lengths of the paths can cause different copies of the signals to interfere with each other. One standard for CDMA wireless communication called cdma2000 has been proposed by members of the 3rd Generation Partnership Project 2 (3GPP2). A system built to adhere to cdma2000 may operate in a mode that provides optimal capacity for voice users or in another mode that provides optimal capacity for packet data users.

One proposed approach to mitigating self-interference induced by multipath signals and frequency selective channels is space-time (S-T) equalization. S-T equalization can be used in a CDMA system, but requires complex signal processing methods and receiver hardware. Also, S-T equalization requires that each subscriber station include multiple receive antennas. The market for subscriber stations is very price-competitive, leading to a large desire of manufacturers to minimize the hardware cost of subscriber stations. The inclusion of additional antennas to the design of a subscriber station can substantially increase the cost of making the subscriber station. There is therefore a need in the art for ways to combat multipath interference without requiring subscriber stations to have multiple receive antennas.

SUMMARY

Embodiments disclosed herein address the above stated needs by enabling a single transmitter to optimize signals transmitted to a particular subscriber station such that multipath interference is reduced or eliminated. A transmitting base station transmits signals through multiple transmit antennas to a subscriber station. The subscriber station performs channel measurements on signals received from the base station through at least two signal paths and sends path characteristic information for each path to the base station. The base station uses the path characteristic information to determine how best to transmit information to the subscriber station through the multiple transmit antennas.

The base station forms signals transmitted through the multiple transmit antennas such that one transmit beam is formed for each of the at least two signal paths. Delays are applied to the signals transmitted along the different signal paths as needed to ensure that they arrive at the single antenna of the receiving subscriber station at the same time. In this way, the effects of multipath transmission can be largely mitigated.

The beams may also be adapted so as to cause minimal interference to each other. Because the transmit beams are mutually non-interfering beams and formed to match each of the signal paths, the strengths of the signals received through the multiple paths at a single subscriber station antenna are maximized.

BRIEF DESCRIPTION OF THE DRAWINGS

Where the same reference number appears in more than one figure, the reference number indicates an identical or similar element or processing step.

DETAILED DESCRIPTION

DEFINITIONS: The word "exemplary" is used herein to mean "serving as an example, instance, or illustration." Any embodiment described herein as "exemplary" is not necessarily to be construed as preferred or advantageous over other embodiments. A subscriber station as discussed herein may be mobile or stationary, and may communicate with one base station or multiple base stations. Though discussed primarily in the context of a wireless communication system, a subscriber station may also communicate through a wired channel, for example using fiber optic or coaxial cables. A subscriber station may further be any of a number of types of devices including but not limited to PC card, compact flash, external or internal modem, or wireless or wireline phone. The communication link through which the subscriber station sends signals to the base station is called a reverse link. The communication link through which a base station sends signals to a subscriber station is called a forward link.

Figure 1:
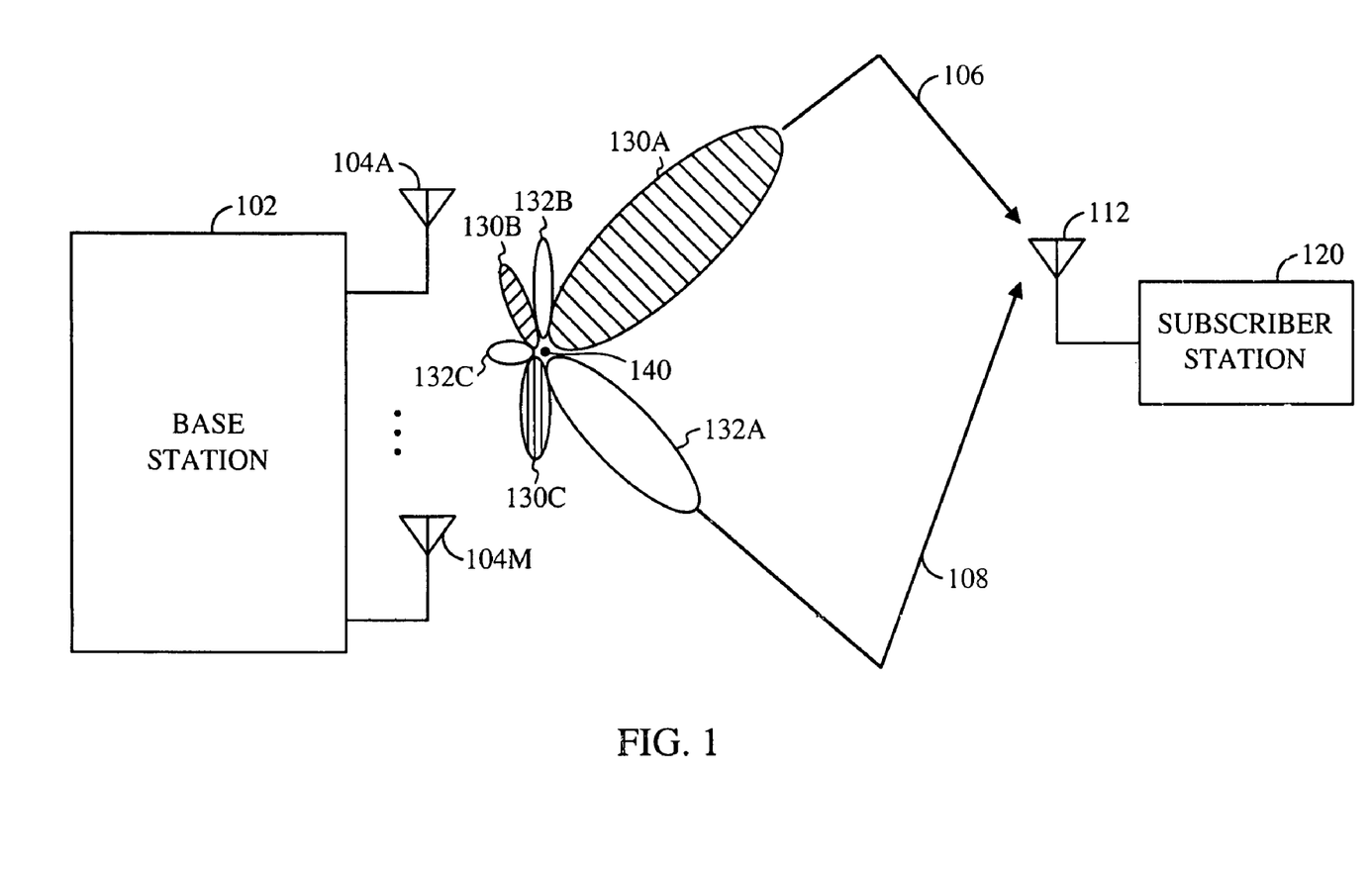
FIG. 1 is a generalized block diagram of a wireless communication system having a base station transmitting signals through multiple transmit antennas to a subscriber station.

FIG. 1 depicts an exemplary wireless communication system in which a base station 102 having a plurality of transmit antennas 104A–104M sends signals to a subscriber station 120 having a single receive antenna 112 through at least two signal paths 106 and 108. Base station 102 transmits signals through the antennas 104A–104M such that one transmit beam 130 is created for transmitting signals along signal path 106. At the same time, base station 102 transmits signals through the antennas 104A–104M such that one transmit beam 132 is created for transmitting signals along signal path 108. Though described in terms of two signal paths (106 and 108), the techniques described below can be easily extended to a greater number of signal paths.

The formation of transmit beams by adapting signals transmitted through multiple antennas is called beam forming, and is well known in the art. Antenna beam patterns are typically shown as radiating from a central point of transmission, with the distance of the curve from the central point indicating the relative strength of a signal transmitted through the antenna. For ease of explanation, the base station 102 and associated antennas 104A–104M are drawn to the left of the antenna beam patterns 130 and 132. In actuality, the antennas 104A–104M would be placed in the center 140 of the antenna beam patterns 130 and 132, and the antenna beam patterns 130 and 132 would radiate directly outward from that center 140.

In the example shown, antenna beam pattern 130 is characterized by a primary lobe 130A and two side lobes 130B and 130C. Similarly, antenna beam pattern 132 is characterized by a primary lobe 132A and two side lobes 132B and 132C. Primary lobe 130A extends further from center 140 than either side lobe 130B or 130C, indicating that a signal transmitted through antenna beam pattern 130 will be strongest in the direction of the primary lobe 130A. As shown, antenna beam pattern 130 is formed such that primary lobe 130A points in the direction of signal path 106. Similarly, antenna beam pattern 132 is formed such that primary lobe 132A points in the direction of signal path 108. In an exemplary embodiment, delays are applied to the signals transmitted along the different signal paths such that they arrive at the single antenna 112 of the receiving subscriber station 120 at the same time. In this way, the effects of multipath transmission can be largely mitigated.

Between the lobes of an antenna beam pattern there exists a null, in which the signals transmitted through antennas 104 destructively interfere with each other. For example, in the antenna pattern 130, nulls exist between lobes 130A and 130B, between lobes 130B and 130C, and between 130C and 130A. In an exemplary embodiment, antenna beam pattern 130 is formed such that its primary lobe 130A is placed within or nearly within the null between lobes 132A and 132B of antenna beam pattern 132. Similarly, antenna beam pattern 132 is formed such that its primary lobe 132A is placed within or nearly within the null between lobes 130A and 130C of antenna beam pattern 130. Such careful arrangement of antenna beam patterns 130 and 132 reduces the degree to which the signals transmitted through each of the antenna beam patterns will destructively interfere with each other when received at subscriber station antenna 112.

Figure 2:
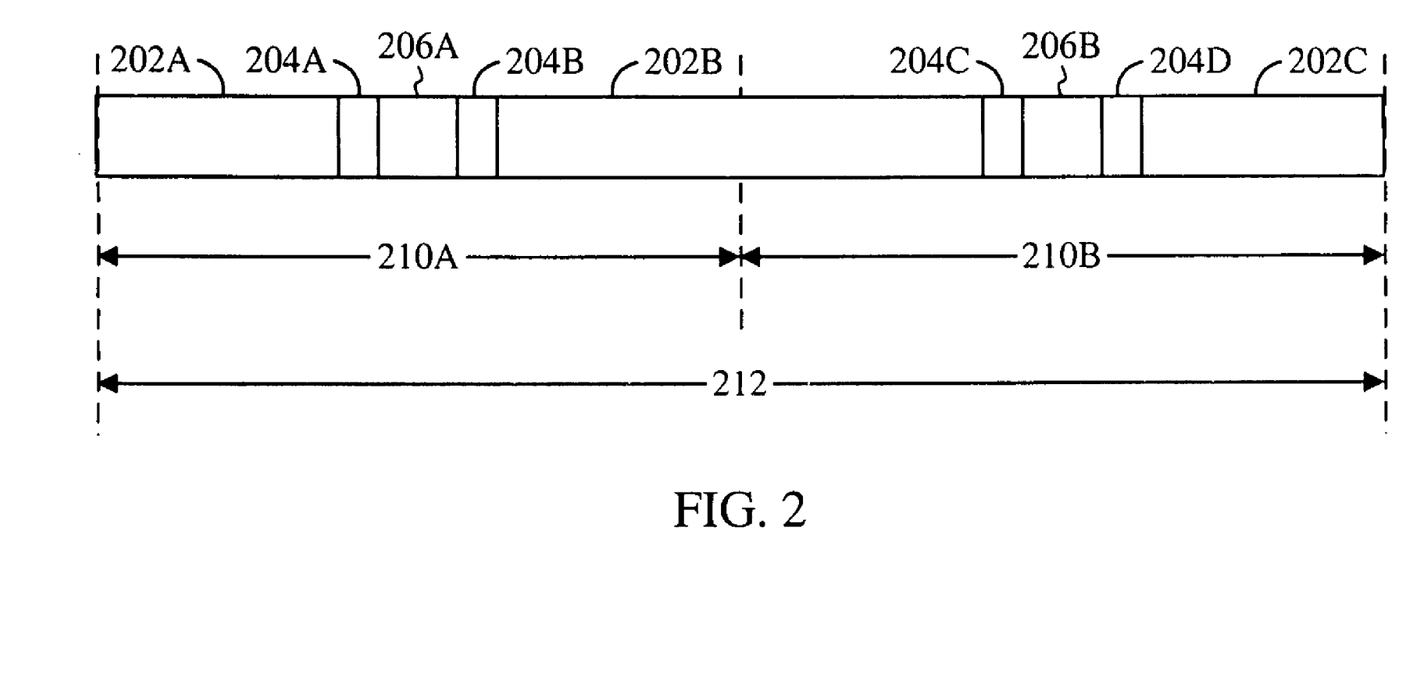
FIG. 2 is a is a diagram of a forward link channel structure wherein a per-antenna pilot burst is transmitted periodically through each transmit antenna.

FIG. 2 is a diagram of an exemplary forward link channel structure wherein a per-antenna pilot burst is transmitted periodically through each transmit antenna. The base station 102 transmits signals within time slots or frames 212 of a fixed duration. Each time slot is divided into two half-slots 210A and 210B. In a cdma2000 system, time slots have a fixed length of 2048 symbol chips and a duration of 1.667 milliseconds. Accordingly, each half-slot has a fixed length of 1024 symbol chips. One skilled in the art will recognize that alternate embodiments may use slots of different lengths or lengths that are not fixed in duration.

In an exemplary embodiment, a per-antenna pilot burst 206 is transmitted through each transmit antenna at the center of each half-slot 210. In an exemplary embodiment, pilot bursts 206 are covered with antenna-specific codes to enable the subscriber station to distinguish the pilot received through each antenna. In an exemplary embodiment, the antenna-specific codes are Walsh codes, with a different Walsh code being assigned to the pilot for each transmit antenna 104. In each frame 212, the base station 102 transmits medium access control (MAC) channel signals 204 immediately before and after each pilot burst 206. The remaining portions 202 of each time slot 212 are used to carry forward link data.

The data portions 202 of the time slot 212 are transmitted along multiple transmit beams 130 and 132, formed to transmit signals optimally through multipath signal paths 106 and 108. Because the transmit beams 106 and 108 generally have different lengths, signals transmitted through them take different amounts of time to reach the subscriber station 120. In an exemplary embodiment, base station 102 advances or retards the signals transmitted through transmit beams 130 and 132 as necessary to ensure that these signals arrive at the antenna 112 of the subscriber station 120 at substantially the same time. Thus, some of the data portions 202 may be transmitted with variable delays relative to the pilot portions 206 and MAC portions 204 of the time slot 212.

Advancing or retarding the data portions 202 of the frame may result in some overlap of the data with the MAC portions 204 or the pilot burst portions 206 of the frame. Such overlap can cause substantial surges or spikes in the power required to transmit the composite signals. Such surges can overload a high power amplifier (HPA) in a transmitter or cause increased interference to signals in the coverage areas of neighboring base stations. Many approaches will be obvious to one of skill in the art for mitigating such surges. For example, a guard band can be placed between the data portions 202 and MAC portions 204 of the frame. The guard band would be wide enough to accommodate the largest probable difference in the lengths of the signal paths 106 and 108 (also called "multipath spread." For example, a guard band of three chips might be enough to accommodate the multipath spread of a typical wireless communication system. Another approach to mitigating transmit power surges would be to truncate or gate the MAC portions 204 as necessary to avoid overlap with the data portions 202 of the frame. Alternatively, the data portions 202 could be truncated or gated in order to avoid such overlap. In another example, the overlapping regions of the MAC portions 204 and the data portions 202 could be attenuated so that the power in the sum of the signals is approximately the same as in other portions of the frame.

One skilled in the art will recognize other obvious variations on transmitting per-antenna pilot signals or otherwise enabling the subscriber station 120 to distinguish signals received through multiple transmit antennas and through multiple transmit paths. Such obvious variations are to be considered within the scope of the inventive concepts and embodiments described herein.

Figure 3:
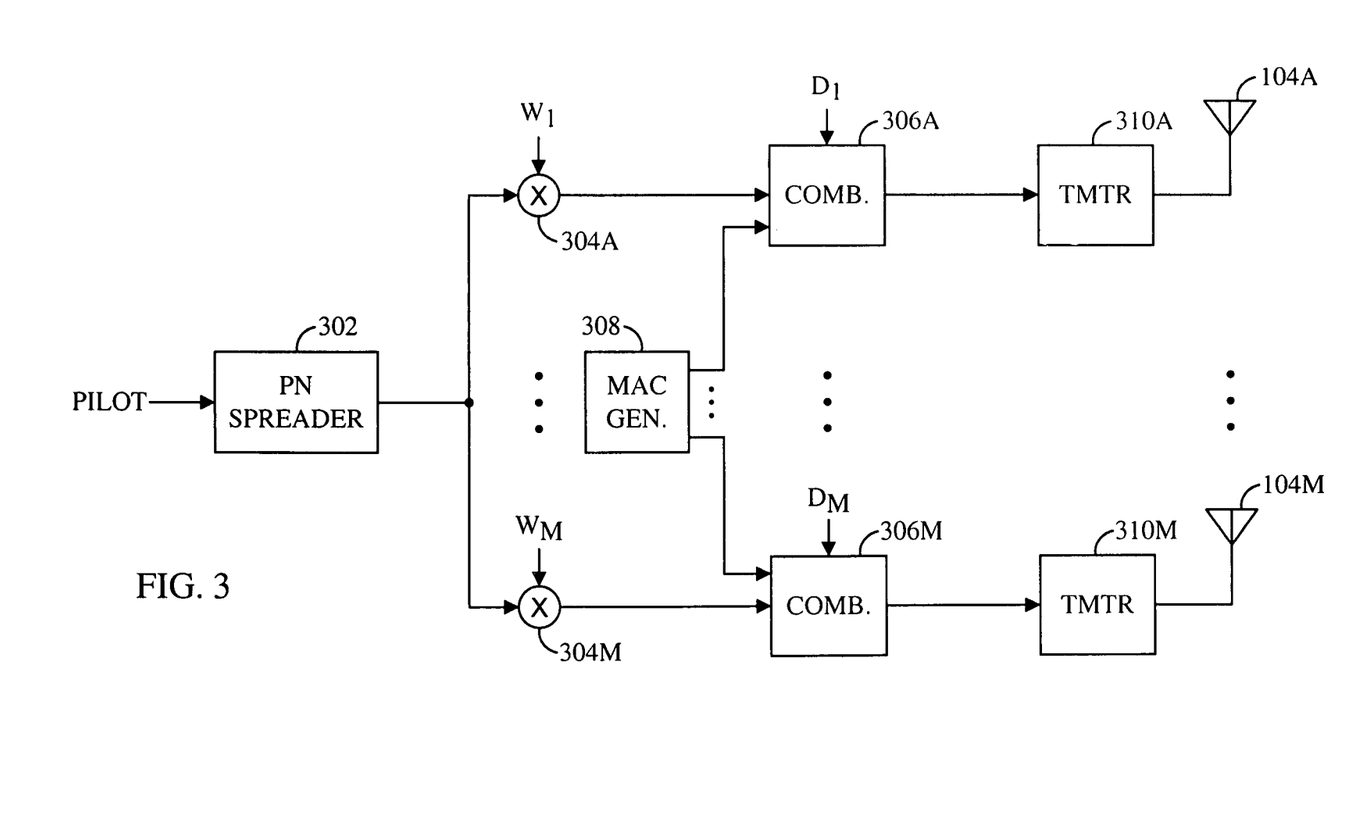
FIG. 3 shows a base station apparatus for transmitting per-antenna pilot signals within the pilot burst sections of each frame.

FIG. 3 shows a base station apparatus for transmitting per-antenna pilot signals within the pilot burst sections 206 of each frame. As discussed above, the pilot burst transmitted through each antenna is covered using an antenna-specific code. This enables the subscriber station 120 to measure the channel characteristics of each path 106 and 108 for each transmit antenna 104. A pilot signal is multiplied by a PN code in a PN spreader 302 in a process also referred to as PN spreading. In a multi-user CDMA system having multiple base stations, each base station uses a PN code at a distinctive PN offset to enable subscriber stations to distinguish the forward link signals of one base station from the forward link signals of another base station. The pilot signal is generally a constant value of either +1 or −1. The output of the PN spreader 302 is provided to one mixer 304 for each of the M transmit antennas 104. Each mixer 304 mixes the signal from the PN spreader 302 with a code that is specific to the corresponding antenna 104. In an exemplary embodiment, the antenna-specific codes are Walsh codes as shown. Where one of the Walsh codes (for example $W_1$) is the all-ones Walsh code, one mixer (for example 304A) can be omitted. The output of each mixer 304 is provided to a signal combiner (COMB.) 306, which combines the pilot signal with the data portions 202 of each transmit frame. Each signal combiner 306 also combines the data portions 202 and pilot bursts 206 with the MAC portions 204 of the frames, provided by a MAC signal generator 308.

As discussed above, each signal combiner 306 may mitigate the effects of overlap between the MAC portions 204 and data portions 202 of the frames by selective attenuation, truncation or gating of those portions of the frames. The combined output signal from each combiner 306 is provided to a transmitter (TMTR) 310, which upconverts and amplifies the signal before transmitting it through an antenna 104. In an exemplary embodiment, each transmitter 310 includes a high power amplifier (not shown) for amplifying the signals transmitted through each antenna 104. Where guard bands are used, or where overlap is permitted between the MAC portions 204 and data portions 202 of the frames, each combiner 306 may be implemented as a summer. Where the MAC portions 204 or data portions 202 are truncated or gated to prevent overlap, each combiner 306 may be implemented as a multiplexer. Where such overlap is mitigated by selective attenuation, each combiner 306 may be implemented as an equalizer, applying appropriate weights to the MAC portions 204 and data portions 202 where they overlap so as to maintain a substantially constant transmit power level.

One of skill in the art will recognize that the various components can be arranged differently than as shown and still generate the same output at each antenna 104. For example, the PN spreader 302 may be removed and instead a separate PN spreader placed between each mixer 304 and each combiner 306. Many other possible arrangements would achieve the same results and are therefore to be considered alternate embodiments of the apparatus shown in FIG. 3.

Figure 4:
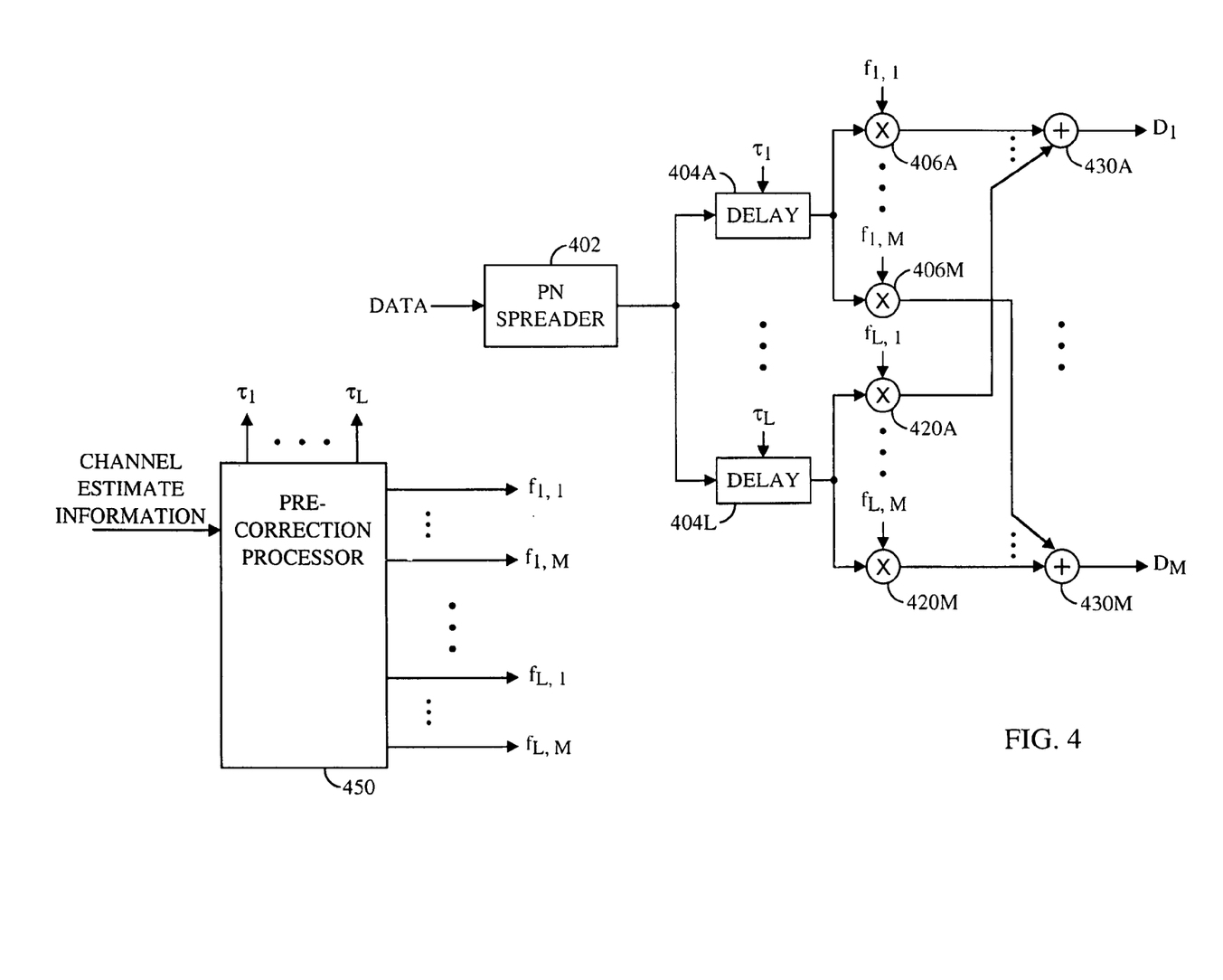
FIG. 4 shows a base station apparatus for transmitting the data portions of each transmit frame.

FIG. 4 shows a base station apparatus for transmitting the data portions 202 of each transmit frame. As shown, the data signal to be transmitted to the subscriber station 120 is spread using a PN code in a PN spreader 402. The resultant PN-spread data signal is then provided to L delay units 404, where L is the number of signal paths through which the data is to be transmitted, and each delay unit 404 is associated with a different transmit beam (such as 130 or 132) and transmit path (such as 106 or 108). Each delay unit 404 delays its corresponding input signal by a delay value τ corresponding to an assigned transmit signal path. The different values of $\tau_1$ through $\tau_L$ are selected such that the signals transmitted through the various transmit beams (such as 130 and 132) and the various signal paths (such as 106 and 108) arrive at the antenna 112 of the subscriber 120 at the same time. In an exemplary embodiment, the delays for paths 2 through L are determined relative to the temporal position of the first path signal, such that the first delay 404A can be omitted.

In the embodiment shown in FIG. 4, each delay 404 is associated with a different transmit beam and transmit path. In order to form a beam for the path associated with delay 404A, the output of the delay 404A must be adjusted for each of the M transmit antennas 104. The output of delay 404A is provided to M weighting units 406. Each of the weighting units 406 applies a weight f that is specific to a single antenna 104 and the transmit beam or path corresponding to the delay 404A. Similarly, the output of delay 404L is provided to M weighting units 420. All M of the weighting units 420 are associated with the transmit beam or path corresponding to the delay 404L. Each of the weighting units 420 applies a weight f that is specific to a single antenna 104 and the transmit beam or path corresponding to the delay 404L. In FIG. 4, the subscripts of the weights f indicate a corresponding path and antenna. For example, $f_{1,1}$ is the weight applied in weighting unit 406A and corresponds to path 1 and antenna 104A, $f_{1,M}$ is the weight applied in weighting unit 406M and corresponds to path 1 and antenna 104M. Weighting unit 420A applies weight $f_{L,1}$ corresponding to path L and antenna 104A, and weighting unit 420M applies weight $f_{L,M}$ corresponding to path L and antenna 104M.

The various delayed and weighted signals for each antenna are summed in a corresponding summer 430 and provided as a corresponding data signal. For example, summer 430A sums all of the delayed and weighted signals for antenna 104A and provides a summed signal $D_1$, to combiner 306A. Similarly, summer 430M sums all of the delayed and weighted signals for antenna 104M and provides a summed signal $D_M$ to combiner 306M.

Figure 5A:
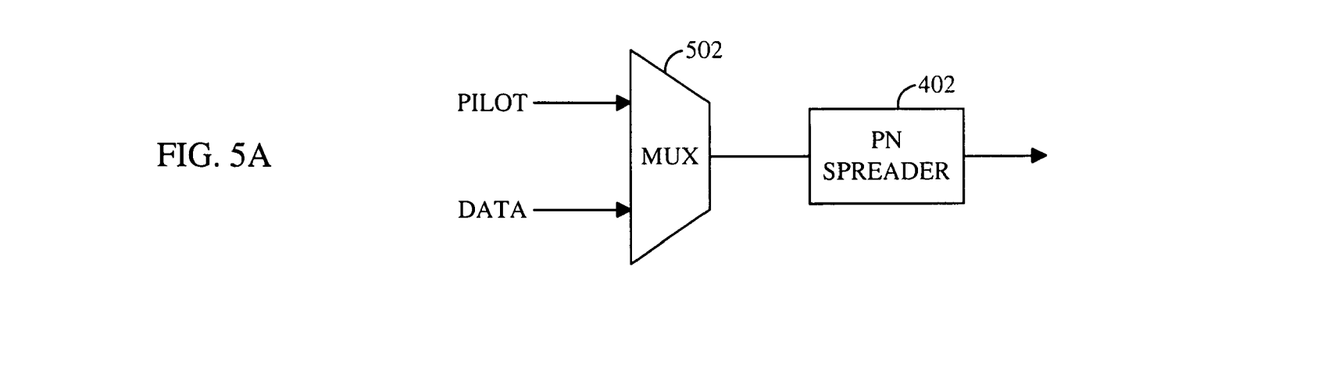
FIGS. 5A and 5B show alternative base station apparatuses for transmitting a data pilot in addition to the pilot burst signals shown in FIG. 3.

In an exemplary embodiment, the data portions 202 sent through the various transmit beams and transmit paths are designed to arrive at the antenna 112 of the subscriber station 120 aligned in time with the pilot bursts 206. In an alternate embodiment, a separate data pilot may be transmitted within the data portions 202 of each frame. For example, as shown in FIG. 5A, a data pilot might be multiplexed in with the data in a multiplexer 502 prior to being PN-spread in PN spreader 402. The data pilot would be transmitted using the same delays and transmit beams as the data.

Figure 5B:
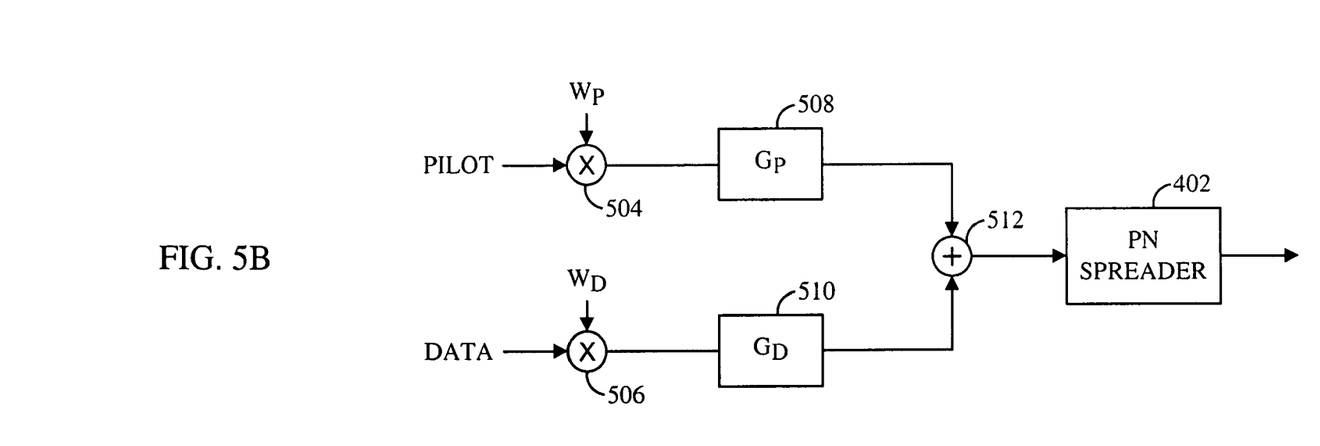

Alternatively, as shown in FIG. 5B, a continuous data pilot might be transmitted for the duration of each data portion 202 of each frame. The transmission of such a continuous data pilot would enable the subscriber station 120 to perform coherent demodulation on the data portions 202 of each frame. In order to allow the subscriber station 120 to distinguish the data pilot from the data, the data pilot and the data are covered using distinguishable codes. In the embodiment shown, the data pilot is covered using a pilot Walsh code $W_P$ in a mixer 504. The data is covered using a data Walsh code $W_D$ in a mixer 506. The Walsh-covered data pilot and Walsh-covered data are then gain-adjusted in gain blocks 508 ($G_P$) and 510 ($G_D$) before being summed in a summer 512. The resulting summed signal is then PN-spread in PN spreader 402. As with the embodiment shown in FIG. 5A, both the data pilot and the data are transmitted using identical delays and through identical transmit beams.

The delay values $\tau_1$ through $\tau_L$ used by delays 404A through 404L and the weights f used by weighting units 406 and 420 are controlled using control signals provided by a pre-correction processor 450. As discussed above, the subscriber station 120 measures the channel characteristics corresponding to each path and each antenna, and generates and transmits channel estimate information to the base station 102 over the reverse link. In an exemplary embodiment, base station 102 includes a receiver (not shown) for downconverting and gain adjusting signals received from the subscriber station 120. The receiver (not shown) provides the downconverted received signals to a PN despreader (not shown), which PN-despreads the downconverted received signals. The PN despreader (not shown) provides the despread signals to a deinterleaver (not shown), which deinterleaves the despread signals. The deinterleaver (not shown) provides the deinterleaved signals to a demodulator (not shown) and decoder (not shown), which demodulate and decode the received signals to produce the channel estimate information received from the subscriber station 120. The receiver apparatuses that are not shown in the figures are well known in the art and capable of being implemented in a variety of ways. The channel estimate information is then provided to the pre-correction processor 450. Pre-correction processor 450 receives this channel estimate information to generate the delay values and weights. In an exemplary embodiment, pre-correction processor 450 employs a pre-rake algorithm to generate the delay values and weights. A pre-rake algorithm identifies multiple independently fading ray paths or multipaths from the channel estimate information. Such a pre-rake algorithm then generates delay values and weights to form one transmit beam and delay corresponding to each of the multipaths. The pre-rake algorithm may generate the weights using Wiener weighting or optimal combiner weighting.

Common among all pre-rake approaches is dealing with the space and time dimensions of the channel estimates separately. In an alternate embodiment, pre-correction processor 450 derives delays and weights without separating the space and time dimensions of the channel estimates. Such a pre-correction approach is referred to as space-time (S-T) pre-correction. In contrast to the multiple distinct transmit beam patterns generated using a pre-rake algorithm, the use of an S-T pre-correction algorithm results in a single antenna pattern that has sizeable lobes in the directions of, and at appropriate compensating delays for, each of the transmit paths (e.g. 106 and 108).

Figure 6:
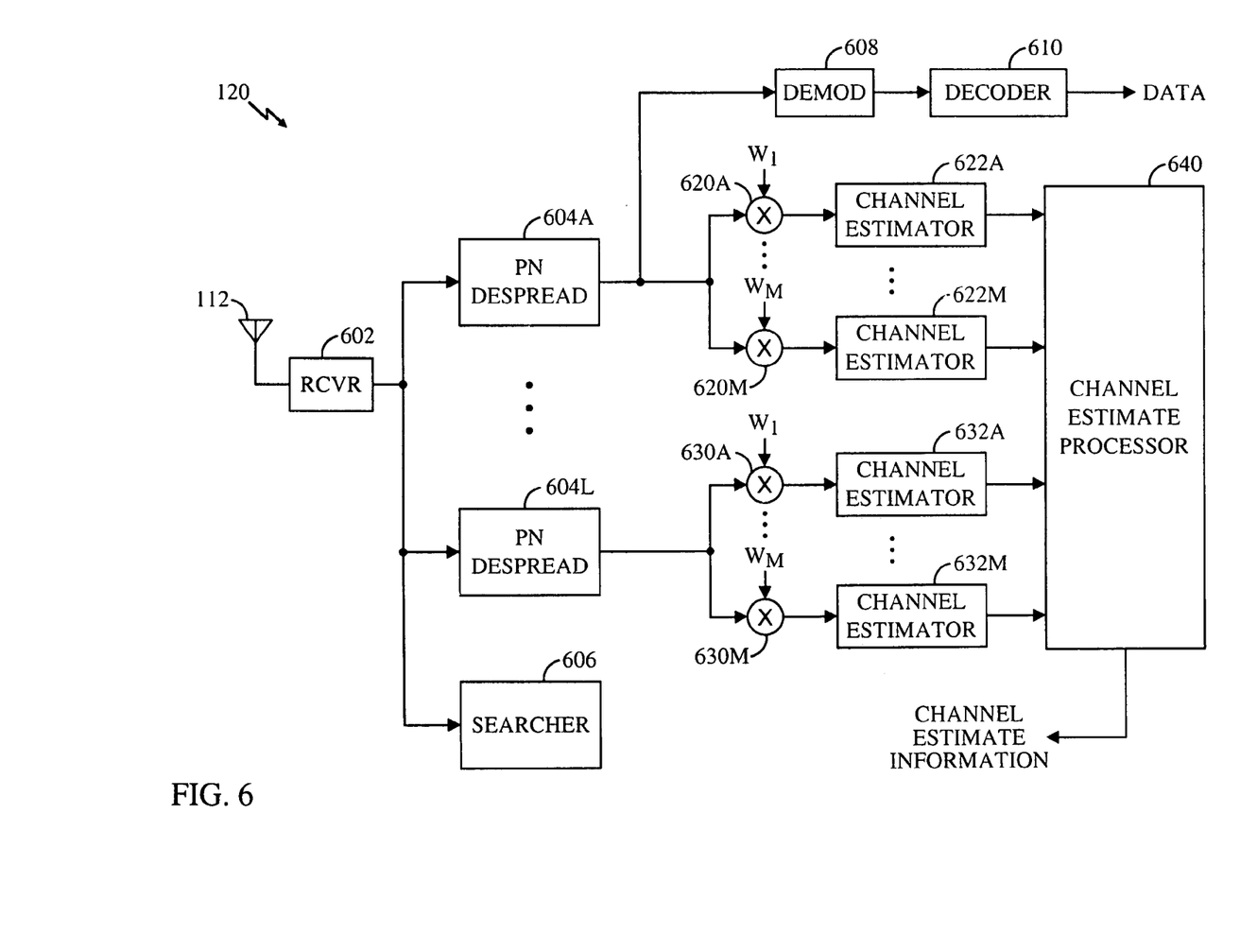
FIG. 6 shows a subscriber station apparatus for receiving and demodulating pilot and data signals generated by a base station using multiple transmit antennas.

FIG. 6 shows a subscriber station apparatus 120 for receiving and demodulating the signal generated by the above-described base station apparatus. Much of the subscriber station apparatus shown is used to provide channel estimate information that is transmitted on the reverse link and used by the pre-correction processor 450 within the base station. The per-antenna pilot signals transmitted in pilot bursts 206 arrive at the receive antenna 112 of the subscriber station 120 through the various transmit paths (such as 106 and 108). The subscriber station apparatus 120 performs individual channel estimation for each pilot received from each antenna through each path. The channel estimation information is collected in a channel estimate processor 640, which generates channel estimate information to be transmitted to the base station 102.

In an exemplary embodiment, subscriber station 120 includes an encoder (not shown) for encoding the channel estimate information, an interleaver (not shown) for interleaving the channel estimate information, a modulator (not shown) for modulating the channel estimate information, and a transmitter (not shown) for upconverting and amplifying data signals for transmission through a transmit antenna. The transmit antenna may be the same as the receive antenna 112 with the use of a diplexor (not shown). Thus, the channel estimate information is transmitted from the subscriber station 120 to the base station 102. The described apparatus used to prepare channel estimate information for transmission are not shown in the figures, but are well known in the art and capable of being implemented in a variety of ways.

The transmit frame signals are received through antenna 112 and downconverted and gain-adjusted in receiver (RCVR) 602. The downconverted signals are used by a searcher 606 to determine the multipath time offsets at which signals are received through the various paths (e.g. 106 and 108). For each path to be estimated, the searcher 606 provides timing information to a PN despreader 604. In the example shown in FIG. 6, one PN despreader (PN DESPREAD) 604 is assigned to each of L transmit paths.

In an exemplary embodiment, the apparatus for gathering channel estimate information for a single path includes a PN despreader 604A, a set of per-antenna pilot de-cover mixers 620, and a set of per-antenna channel estimators 622. After PN despreading, a received pilot burst portion 206 of a frame for a single transmit path will contain a different pilot signal for each transmit antenna 104 of the base station 102. These different pilot signals can be distinguished by their different pilot covers. For example, the pilot for antenna 104A is de-covered using a pilot de-cover mixer 620A, which multiplies the PN-despread pilot burst portion 206 by the corresponding pilot cover. In an exemplary embodiment, Walsh codes are used to distinguish the various pilots. For example, the Walsh code $W_1$ used to modulate the pilot in mixer 304A would be the same as that applied in pilot de-cover mixer 620A. Similarly, the Walsh code $W_M$ used to modulate the pilot in mixer 304M would be the same as that applied in pilot de-cover mixer 620M. The pilot de-covered signals for each antenna is used as input to a channel estimator 622 that corresponds to that antenna. For example, the signal de-covered using Walsh code $W_1$ is provided to channel estimator 622A. The output of channel estimator 622A is an estimate of the channel for the signal transmitted from antenna 104A through the path corresponding to PN despreader 604A. Similarly, the signal de-covered using Walsh code $W_M$ is provided to channel estimator 622M, which generates an estimate of the channel from antenna 104M through the path corresponding to PN despreader 604A.

As shown, a similar set of elements are used to estimate the channels for each of M antennas 104 and for each of L transmit paths. For the Lth transmit path, the output of PN despreader 604L is provided to a set of pilot de-cover mixers 630A through 630M and channel estimators 632A through 632M. For each transmit antenna 104, there is a corresponding pilot de-cover mixer 630A and channel estimator 632. For example, for antenna 104A, the corresponding pilot is de-covered using Walsh code W1 in pilot de-cover mixer 630A, and the resulting de-covered pilot signal is provided to channel estimator 632A. Channel estimator 632A generates an estimate of the channel from antenna 104A through the Lth transmit path. Where one of the Walsh codes (for example W1) is the all-ones Walsh code, one mixer can be omitted for each path (for example 620A and 630A).

Each channel estimator 622 and 632 estimates channel characteristics associated with a single transmit antenna 104 and a single path (e.g. 106 or 108). Each channel estimator 622 and 632 can use any of a variety of techniques for generating a channel estimate from a de-covered pilot signal. For example, each channel estimator 622 and 632 may be implemented as a finite-impulse-response (FIR) low-pass filter. In an alternate embodiment, each channel estimator 622 and 632 may be implemented as an accumulator. The channel estimates generated by channel estimators 622 and 632 are provided to channel estimate processor 640, which uses the estimates to generate channel estimate information that is sent to the base station 102 over the reverse link.

As discussed above, the base station 102 transmits the data portions 202 of the transmit frames through the different transmit beams and transmit paths at different delays. The delays are arranged such that the data portions 202 transmitted through the different transmit beams and transmit paths arrive at receive antenna 112 at the same time. In an exemplary embodiment, the data portions 202 are timed such that they arrive at transmit antenna 112 in synchronism with the pilot signals received through the first transmit path. For example, where $\tau_1$ is set to zero, and is associated with path 106, the data portion 202B of a data frame sent through that path would arrive at antenna 112 immediately after MAC portion 204B, which would arrive at antenna 112 immediately after pilot burst portion 206A. Where data transmitted through beam 132 and transmit path 108 are adjusted to compensate for the difference in path length between transmit paths 106 and 108, the data portions transmitted through transmit path 108 arrive at antenna 112 at the same time as the data portions transmitted through transmit path 106.

Figure 7A:
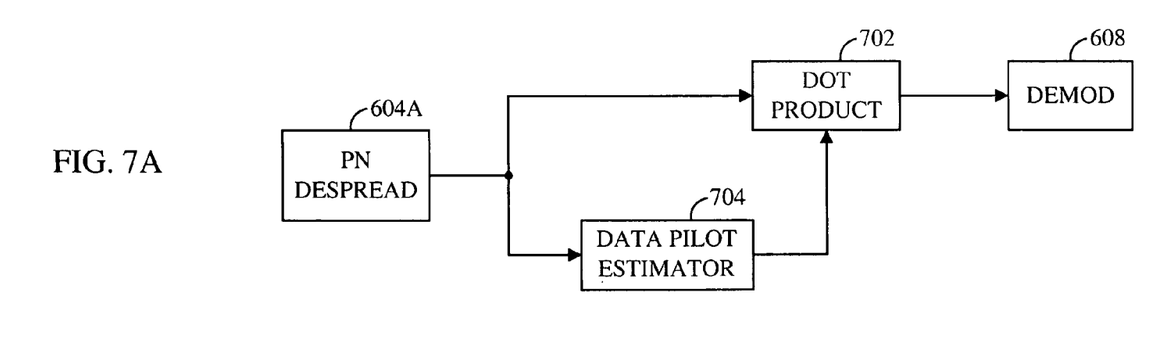
FIGS. 7A and 7B show alternative apparatuses for receiving data pilot and data signals generated using the apparatuses shown in FIGS. 5A and 5B.
Figure 7B:
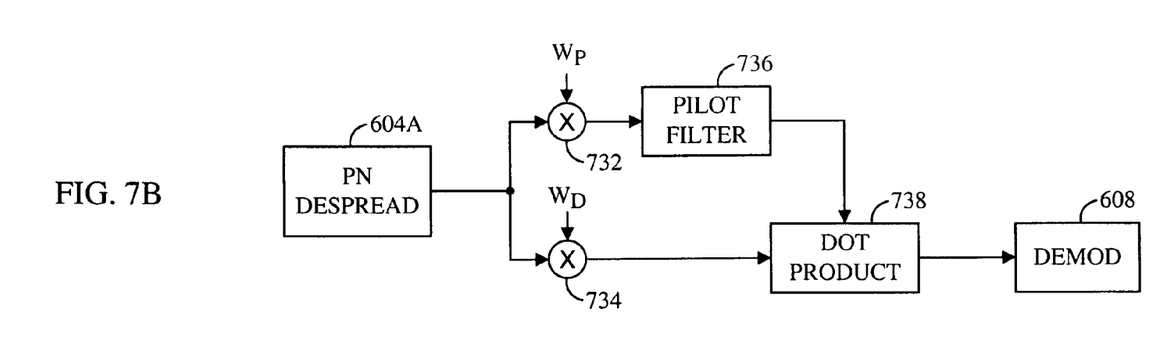

The synchronization between data portions transmitted through different transmit paths allows the subscriber station 120 to demodulate and decode those data portions as a signal received through a single path. Where the signals are arranged to be synchronized with the pilot portions 206 for a single transmit path, the same PN despreader can be used to PN-despread signals used for both channel estimation and data demodulation. In the example shown in FIG. 6, the data portions transmitted by the base station 102 are time-aligned with the frames received through the transmit path that corresponds with PN despreader 604A. Outside of the pilot burst portions 206 and MAC portions 204 of each frame, the output of PN despreader 604A can be used as input for a data demodulator (DEMOD) 608, which demodulates the data portions 202 of each frame. In a noiseless wireless propagation environment, the output of PN despreader 604A during the data portions 202 of each frame would contain a strong component of the signal used as input by PN spreader 402. The demodulated data portions 202 of each frame are provided by demodulator 608 to a data decoder 610, which produces a decoded data stream.

Where separate data pilots are transmitted during data portions 202 of frames as shown in FIGS. 5A and 5B, the subscriber station 120 must include additional elements to take advantage of those data pilots. Exemplary embodiments of these additional elements are shown in FIGS. 7A and 7B. For example, where a data pilot is multiplexed in with the data as shown in FIG. 5A, the output of PN despreader 604A would be provided to a data pilot channel estimator 704, which generates a data weight and phase to be applied to the data in a dot product unit 702. The output of the dot product unit 702 is then provided to demodulator 608. Where a continuous data pilot is generated as shown in FIG. 5B, the output of PN despreader 604 would be provided to a pilot Walsh de-cover mixer 732 and to a data Walsh de-cover mixer 734. The output of the pilot Walsh de-cover mixer 732 would then be provided to a pilot filter 736, which would generate a data weight and phase to be applied to the data in a dot product unit 738. The output of the dot product unit 738 is then provided to demodulator 608. The operation of pilot estimators and dot product units to accomplish coherent demodulation is well known in the art. Data pilot estimator 704 and pilot filter 736 may be implemented in any of a variety of ways including FIR filters and accumulators.

One of skill in the art will recognize that, where pilot Walsh code $W_P$ is the all-ones Walsh code, mixer 504 and Walsh de-cover mixer 732 may be omitted from the base station 102 and subscriber station 120, respectively.

Figure 8:
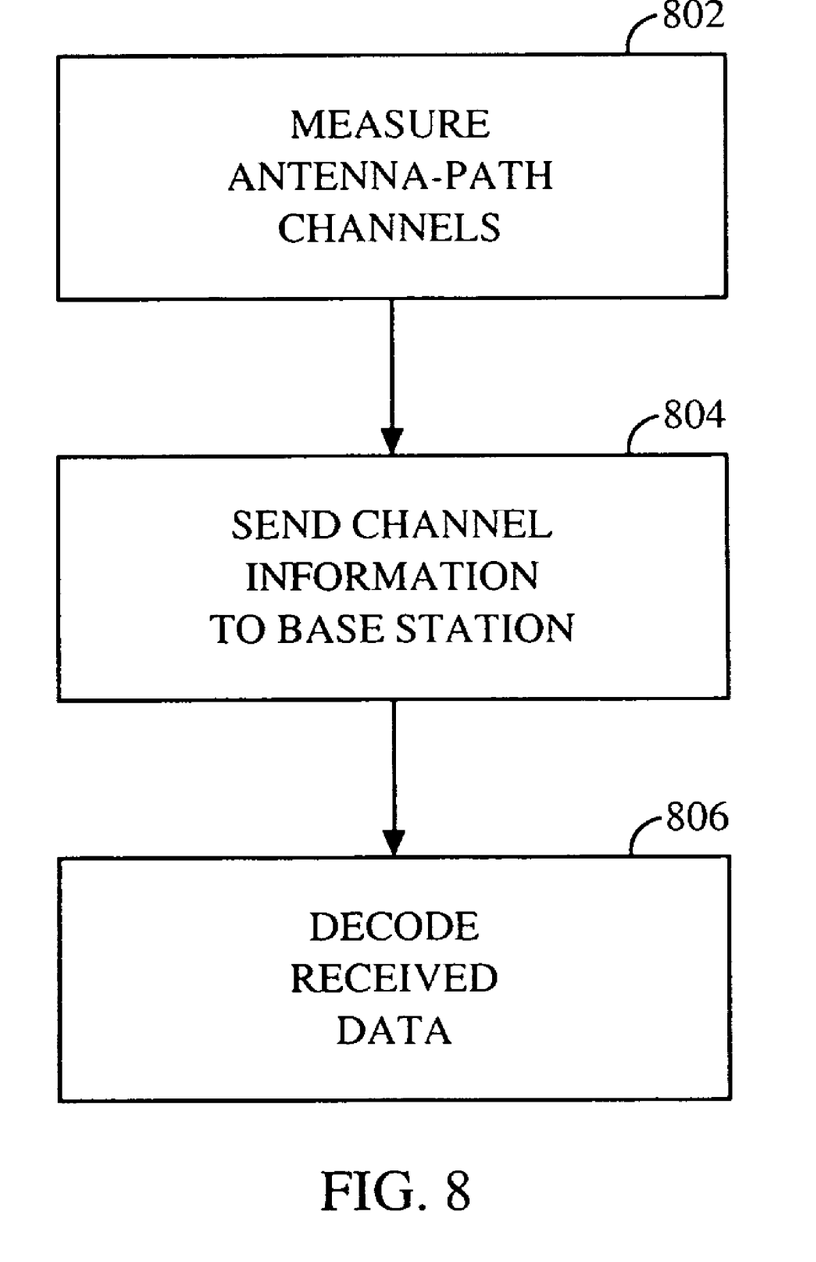
FIG. 8 shows a subscriber station method for receiving data transmitted from multiple base station transmit antennas and through multiple transmit paths.

FIG. 8 shows a subscriber station method for receiving data transmitted from multiple base station transmit antennas and through multiple transmit paths. At step 802, the subscriber station 120 performs channel measurements corresponding to a plurality of antenna-path combinations. Specifically, the subscriber station generates channel estimates for signals received from each of a plurality of base station transmit antennas 104 through each of a plurality of transmit paths (e.g. 106 and 108). In an exemplary embodiment, the channel estimates are generated by performing channel estimates for each transmit path using per-antenna pilot codes to distinguish the pilot signals received from different transmit antennas 104. In an exemplary embodiment, the signals received are formatted into frames as described in association with FIG. 2. In an exemplary embodiment, the channel estimates are measured in the same way as described in association with FIG. 6. At step 804, the subscriber station 120 generates channel estimate information from the measured channel estimates and sends the channel estimate information to the base station 102 over the reverse link. At step 806, the subscriber station 120 receives data through the multiple paths and decodes the data as though it had been received through a single path. One skilled in the art will recognize that the above-described steps may be performed in a different order than depicted in FIG. 8 to achieve the same outcome.

Figure 9:
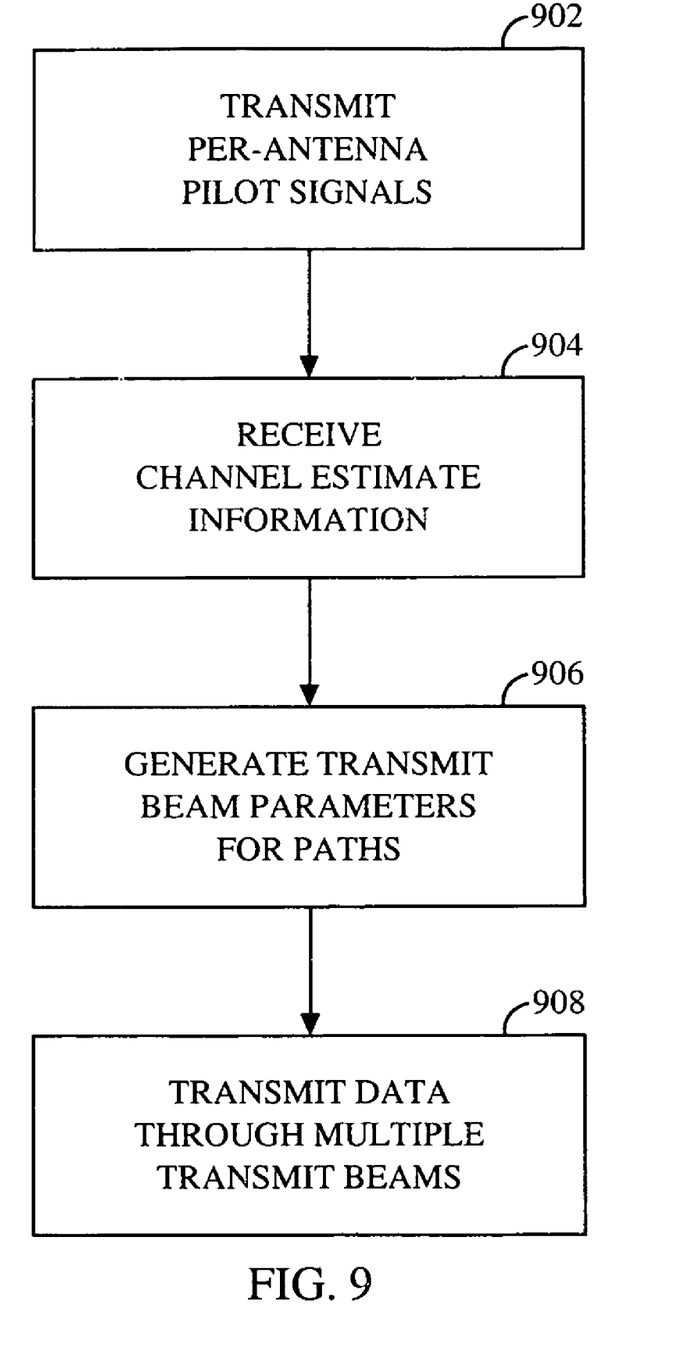
FIG. 9 shows a base station method for transmitting data to a subscriber station through multiple base station transmit antennas and multiple transmit paths.

FIG. 9 shows a base station method for transmitting data to a subscriber station 120 through multiple base station transmit antennas 104 and multiple transmit paths (e.g. 106 and 108). At step 902, the base station 102 transmits pilot signals through each of the multiple transmit antennas 104 such that the pilot signals can be distinguished from each other upon being received through a single antenna 112 of the subscriber station 120. At step 904, the base station 102 receives channel estimate information on the reverse link from the subscriber station 120. At step 906, the base station uses the received channel estimate information to generate transmit beam parameters for use in transmitting data to the subscriber station 120 along transmit beams that correspond to the multiple transmit paths. At step 906, the base station 102 also determines the relative delays to be applied to signals transmitted through each of the transmit beams. At step 908, the base station 102 transmits data to the subscriber station 120 using the relative delays and along the multiple transmit beams determined at step 906.

Step 906 may be performed by a pre-correction processor 450 as described above. Also, the pilot signals and data signals may be generated as described above in accordance with FIGS. 1–4, 5A, and 5B. Furthermore, one skilled in the art will recognize that the above-described steps may be performed in a different order than depicted in FIG. 9 to achieve the same outcome.

In an exemplary embodiment, PN spreaders 302 and 402 are complex PN spreaders, and generate complex outputs having real and imaginary components. In an exemplary embodiment, each transmitter 310 treats complex input signals as quaternary phase shift keying (QPSK) signals for purposes of upconversion and transmission. For example, the real components of an input signal would be upconverted as in-phase components by multiplication by a cosine carrier, and the imaginary components would be upconverted as quadrature-phase components by multiplication by a sine carrier. The resulting in-phase and quadrature-phase signals could then be summed in a summer before being amplified in an HPA and transmitted through an antenna 104.

Those of skill in the art would understand that, the various signals passed between apparatus elements may be digital or analog, or may be converted from digital to analog at any of a variety of points within each apparatus. The representation of the various signals in either digital or analog form is anticipated and will not cause an apparatus to deviate from the embodiments discussed herein.

Those of skill in the art would understand that information and signals may be represented using any of a variety of different technologies and techniques. For example, transmit beams may be formed in ways other than adjusting signals transmitted through multiple antennas. In an exemplary embodiment, the transmit antennas 104 used by base station 102 are omnidirectional or sectorized antennas having substantially the same coverage areas. In an alternate embodiment, however, pilot signals may be transmitted through such omnidirectional or sectorized antennas, but data is transmitted through a plurality of directional beam antennas. Each such beam antenna may be fixed at a particular angle, such that pre-correction processor 450 would select a delay and a beam angle for a particular transmit path based on channel estimate information received from the subscriber station. Alternatively, the beam antennas may be moveable to different angles using a motor or servo controlled by pre-correction processor 450.

In addition, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC within the receiver. In the alternative, the processor and the storage medium may reside as discrete components in a receiver.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A transmitter for transmitting a signal to a subscriber station through at least two transmit antennas, the transmitter comprising:

means for transmitting a first pilot signal through a first transmit antenna;

means for transmitting a second pilot signal through a second transmit antenna;

means for receiving channel estimate information corresponding to said first and second pilot signals;

means for generating delays and weights based on said channel estimate information, the delays corresponding to a plurality of signal paths to the subscriber station, the weights corresponding to the first and second antennas and to the plurality of signal paths;

means for applying said delays and weights to data to produce delayed, weighted data; and means for summing the delayed, weighted data for the first and second antennas to transmit to the subscriber station, the delays causing the data transmitted on the plurality of signal paths to arrive at the subscriber station at substantially the same time, the weights causing the antennas to form a plurality of beam patterns with primary lobes along the plurality of signal paths such that a primary lobe of one beam pattern is placed nearly within a null between two lobes of another beam pattern.

2. A method for transmitting a signal to a subscriber station through at least two transmit antennas, the method comprising:

transmitting a first pilot signal through a first transmit antenna;

transmitting a second pilot signal through a second transmit antenna;

receiving channel estimate information corresponding to said first and second pilot signals;

generating delays and weights based on said channel estimate information, the delays corresponding to a plurality of signal paths to the subscriber station, the weights corresponding to the first and second antennas and to the plurality of signal paths;

applying said delays and weights to data to produce delayed, weighted data;

summing the delayed, weighted data for the first and second antennas to transmit to the subscriber station, the delays causing the data transmitted on the plurality of signal paths to arrive at the subscriber station at substantially the same time, the weights causing the antennas to form a plurality of beam patterns with primary lobes along the plurality of signal paths such that a primary lobe of one beam pattern is placed nearly within a null between two lobes of another beam pattern; and transmitting the summed, delayed and weighted data through the first and second transmit antennas.

3. A computer readable media embodying a method for transmitting a signal to a subscriber station through at least two transmit antennas, the method comprising:

transmitting a first pilot signal through a first transmit antenna;

transmitting a second pilot signal through a second transmit antenna;

receiving channel estimate information corresponding to said first and second pilot signals;

generating delays and weights based on said channel estimate information, the delays corresponding to a plurality of signal paths to the subscriber station, the weights corresponding to the first and second antennas and to the plurality of signal paths;

applying said delays and weights to data to produce delayed, weighted data;

summing the delayed, weighted data for the first and second antennas to transmit to the subscriber station, the delays causing the data transmitted on the plurality of signal paths to arrive at the subscriber station at substantially the same time, the weights causing the antennas to form a plurality of beam patterns with primary lobes along the plurality of signal paths such that a primary lobe of one beam pattern is placed nearly within a null between two lobes of another beam pattern; and transmitting the summed, delayed and weighted data through the first and second transmit antennas.

4. A base station apparatus comprising:

at least first and second transmit antennas;

a first mixer corresponding to a first transmit antenna, for applying a first cover code to a pilot signal to be transmitted through the first transmit antenna;

a second mixer corresponding to a second transmit antenna, for applying a second cover code to the pilot signal to be transmitted through the second transmit antenna;

receiver for receiving channel estimate information corresponding to said first and second pilot signals for at least two transmit paths per transmit antenna;

a processor for generating delays and weights based on said channel estimate information, the delays corresponding to a plurality of signal paths to the subscriber station, the weights corresponding to the first and second antennas and to the plurality of signal paths;

means for applying said delays and weights to data to produce delayed, weighted data;

a summer for combining said delayed, weighted data for the first and second antennas to transmit to the subscriber station, the delays causing the data transmitted on the plurality of signal paths to arrive at the subscriber station at substantially the same time, the weights causing the antennas to form a plurality of beam patterns with primary lobes along the plurality of signal paths such that a primary lobe of one beam pattern is placed nearly within a null between two lobes of another beam pattern; and a transmitter for transmitting the summed, delayed, weighted data through said transmit antennas.

5. A remote station apparatus for receiving signals transmitted from at least two transmit antennas and through at least two transmit paths, the apparatus comprising:

means for determining a plurality of paths of pilot signals transmitted by the at least two transmit antennas;

at least four channel estimators, wherein each channel estimator measures channel information corresponding to a signal received through a different combination of one of the at least two transmit antennas and one of the at least two transmit paths wherein the signal transmitted through each of said at least two transmit antennas is adjusted based on said pre-correction delays and weights;

channel estimate processor for generating channel estimate information based on said measured channel information;

means for transmitting said channel information;

means for receiving data signals transmitted from the at least two transmit antennas through the plurality of paths; and means for demodulating the received data signals from the plurality of paths as substantially a single signal received through a single path.

* * * * *